US012719565B2

(12) United States Patent
Määttänen et al.

(10) Patent No.: US 12,719,565 B2
(45) Date of Patent: Aug. 25, 2026

(54) UE PROCEDURES FOR CONTROLLING CHANNEL QUALITY MEASUREMENTS IN NON-TERRESTRIAL NETWORKS

(71) Applicant: Telefonaktiebolaget LM Ericsson (publ), Stockholm (SE)

(72) Inventors: Helka-Liina Määttänen, Espoo (FI); Johan Rune, Lidingö (SE); Emre Yavuz, Stockholm (SE); Chao He, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 638 days.

(21) Appl. No.: 18/021,416

(22) PCT Filed: Aug. 17, 2021

(86) PCT No.: PCT/EP2021/072852
§ 371 (c)(1),
(2) Date: Feb. 15, 2023

(87) PCT Pub. No.: WO2022/038149
PCT Pub. Date: Feb. 24, 2022

(65) Prior Publication Data

US 2023/0308168 A1 Sep. 28, 2023

Related U.S. Application Data

(60) Provisional application No. 63/066,585, filed on Aug. 17, 2020.

(51) Int. Cl.
*H04B 7/185* (2006.01)

(52) U.S. Cl.
CPC ..... *H04B 7/18519* (2013.01); *H04B 7/18541* (2013.01)

(58) Field of Classification Search
CPC ........... H04B 7/18519; H04B 7/18541; H04W 24/10; H04W 84/06
See application file for complete search history.

(56) References Cited

U.S. PATENT DOCUMENTS 9,014,146 B2 * 4/2015 Lee .................... H04W 36/302 370/332
2016/0112908 A1 4/2016 Chin et al.
(Continued)

FOREIGN PATENT DOCUMENTS

CN 104137606 A 11/2014
EP 0808034 A2 11/1997
(Continued)

OTHER PUBLICATIONS

Author Unknown, "Technical Specification Group Radio Access Network; Study on New Radio (NR) to support hon-terrestrial networks (Release 15)," Technical Report 38.811, Version 15.4.0, Sep. 2020, 3GPP Organizational Partners, 127 pages.
(Continued)

*Primary Examiner* — Ayman A Abaza
(74) *Attorney, Agent, or Firm* — Withrow & Terranova, PLLC

(57) ABSTRACT

User Equipment (UE) procedures are provided for controlling channel quality measurements in Non-Terrestrial Networks (NTNs). One proposed solution adds an expected duration of time the UE is to be served by a NTN serving cell, referred to as $T_{service}$, to the rules of channel quality measurements. $T_{service}$ represents the remaining time until the UE's serving cell will be replaced by another cell (i.e., the time until another satellite will take over the responsibility to cover the UE's location). In some embodiments, $T_{service}$ is added to the rules of channel quality measurements such that the UE does not have to measure neighbor cells if the $T_{service}$ is high enough for the current cell and current
(Continued)

channel quality in the cell is sufficient. Or, even if Reference Signal Received Power (RSRP) of the current cell is sufficient, UE needs to measure if $T_{service}$ of the current cell is less than a threshold.

24 Claims, 10 Drawing Sheets

(56) References Cited

U.S. PATENT DOCUMENTS

| | | | | |
|---|---|---|---|---|
| 2016/0353295 | A1* | 12/2016 | Wu | H04W 72/51 |
| 2017/0041830 | A1 | 2/2017 | Davis et al. | |
| 2017/0105153 | A1 | 4/2017 | Ashrafi et al. | |
| 2020/0162939 | A1* | 5/2020 | Kim | H04W 16/28 |
| 2020/0178135 | A1 | 6/2020 | Yun et al. | |
| 2020/0187035 | A1* | 6/2020 | Maattanen | H04L 1/0026 |
| 2020/0213891 | A1* | 7/2020 | Hong | H04W 36/0061 |
| 2020/0314673 | A1* | 10/2020 | Deogun | H04W 24/08 |
| 2022/0086671 | A1* | 3/2022 | Hong | H04W 16/28 |

FOREIGN PATENT DOCUMENTS

| | | | |
|---|---|---|---|
| KR | 101581653 | B1 | 12/2015 |
| WO | 2017023576 | A1 | 2/2017 |
| WO | 2017189862 | A1 | 11/2017 |
| WO | 2018205885 | A1 | 11/2018 |
| WO | 2019170866 | A1 | 9/2019 |
| WO | 2020076220 | A1 | 4/2020 |
| WO | 2020145559 | A1 | 7/2020 |
| WO | 2021156749 | A1 | 8/2021 |

OTHER PUBLICATIONS

Author Unknown, "Technical Specification Group Radio Access Network; Solutions for NR to support non-terrestrial networks (NTN) (Release 16)," Technical Report 38.821, Version 16.0.0, Dec. 2019, 3GPP Organizational Partners, 140 pages.

Author Unknown, "Technical Specification Group Radio Access Network; Evolved Universal Terrestrial Radio Access (E-UTRA); User Equipment (UE) procedures in idle mode (Release 16)," Technical Specification 36.304, Version 16.1.0, Jul. 2020, 3GPP Organizational Partners, 63 pages.

Author Unknown, "Technical Specification Group Radio Access Network; NR; Requirements for support of radio resource management (Release 16)," Technical Specification 38.133, Version 16.4.0, Jun. 2020, 3GPP Organizational Partners, 1,463 pages.

Author Unknown, "Technical Specification Group Radio Access Network; NR; User Equipment (UE) procedures in Idle mode and RRC Inactive state (Release 16)," Technical Specification 38.304, Version 16.1.0, Jul. 2020, 3GPP Organizational Partners, 39 pages.

Thales, "RP-181370: Study on solutions evaluation for NR to support Non Terrestrial Network, " 3GPP TSG RAN meeting #80, Jun. 11-14, 2018, La Jolla, California, 5 pages.

International Search Report and Written Opinion for International Patent Application No. PCT/EP2021/072852, mailed Dec. 7, 2021, 10 pages.

International Search Report and Written Opinion for International Patent Application No. PCT/IB2021/050842, mailed May 21, 2021, 9 pages.

First Office Action for Chinese Patent Application No. 202180070916.2, mailed Jul. 16, 2025, 18 pages.

Mediatek Inc., "RP-193235: New Study WID on NB-IoT/eTMC support for NTN," 3GPP TSG RAN Meeting #86, Dec. 9-31, 2019, Sitges, Spain, 4 pages.

Thales, "RP-193234: Solutions for NR to support non-terrestrial networks (NTN)," 3GPP TSG RAN Meeting #86, Dec. 9-13, 2019, Sitges, Spain, 10 pages.

Lin, et al., "5G New Radio Evolution Meets Satellite Communications: Opportunities, Challenges, and Solutions," arXiv.org, Mar. 27, 2019, 8 pages.

Notice of Reasons for Rejection for Japanese Patent Application No. 2023-511891, mailed Feb. 6, 2024, 6 pages.

Third Office Action for Chinese Patent Application No. 202180070916.2, mailed Jun. 23, 2026, 9 pages.

Examination Report for European Patent Application No. 21762484.0, mailed May 29, 2026, 4 pages.

* cited by examiner

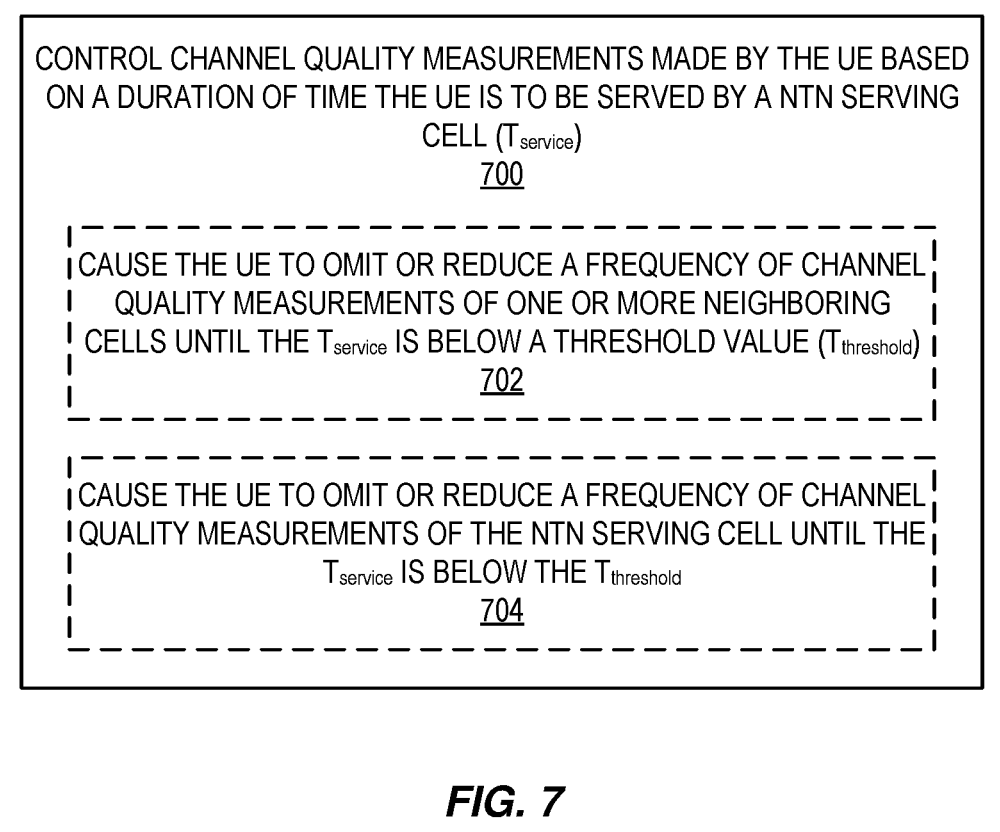

CONTROL CHANNEL QUALITY MEASUREMENTS MADE BY THE UE BASED ON A DURATION OF TIME THE UE IS TO BE SERVED BY A NTN SERVING CELL ($T_{service}$)
700

CAUSE THE UE TO OMIT OR REDUCE A FREQUENCY OF CHANNEL QUALITY MEASUREMENTS OF ONE OR MORE NEIGHBORING CELLS UNTIL THE $T_{service}$ IS BELOW A THRESHOLD VALUE ($T_{threshold}$)
702

CAUSE THE UE TO OMIT OR REDUCE A FREQUENCY OF CHANNEL QUALITY MEASUREMENTS OF THE NTN SERVING CELL UNTIL THE $T_{service}$ IS BELOW THE $T_{threshold}$
704

*FIG. 7*

UE PROCEDURES FOR CONTROLLING CHANNEL QUALITY MEASUREMENTS IN NON-TERRESTRIAL NETWORKS

RELATED APPLICATIONS

This application is a 35 U.S.C. § 371 national phase filing of International Application No. PCT/EP2021/072852, filed Aug. 17, 2021, which claims the benefit of U.S. provisional patent application Ser. No. 63/066,585, filed Aug. 17, 2020, the disclosures of which are hereby incorporated herein by reference in its entirety their entireties.

TECHNICAL FIELD

The present disclosure relates to Non-Terrestrial Networks (NTN), and more particularly to channel quality in NTNs.

BACKGROUND

There is an ongoing resurgence of satellite communications. Several plans for satellite networks have been announced in the past few years. The target services vary, from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong existing mobile ecosystem and economy of scale, adapting terrestrial wireless access technologies, including Fourth Generation (4G) Long Term Evolution (LTE) and Fifth Generation (5G) New Radio (NR) for satellite networks is drawing significant interest. For example, the Third Generation Partnership Project (3GPP) completed an initial study in Release 15 on adapting NR to support Non-Terrestrial Networks (NTNs) (mainly satellite networks). This initial study focused on the channel model for NTNs, defining deployment scenarios, and identifying key potential impacts. 3GPP is conducting a follow-up study item in Release 16 on solutions evaluation for NR to support NTNs.

Depending on the orbit altitude, a satellite may be categorized as Low Earth Orbit (LEO), Medium Earth Orbit (MEO), or Geostationary Orbit (GEO) satellite:

LEO: typical heights ranging from 500-1,500 km, with orbital periods ranging from 90-130 minutes.

MEO: typical heights ranging from 5,000-25,000 km, with orbital periods ranging from 2-14 hours.

GEO: height at 35,786 km, with an orbital period of 24 hours.

A satellite typically generates several beams over a given area. The footprint of a beam is usually in an elliptic shape, which has been traditionally considered as a cell. The footprint of a beam is also often referred to as a spotbeam. The footprint of a spotbeam may move over the earth's surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders. Access link denotes a communications link between a User Equipment (UE) and a satellite, and feeder link denotes a link between the satellite and a ground base station.

The objectives of the current 3GPP NTN Study Item (SI) are to evaluate solutions for the identified key impacts from the preceding SI and to study impact on Radio Access Network (RAN) protocols/architecture. The objectives for layer 2 and above are:

| Study the following aspects and identify related solutions if needed: |
| --- |
| Propagation delay: Identify timing requirements and solutions on layer 2 aspects, MAC, RLC, RRC, to support non-terrestrial network propagation delays considering FDD and TDD duplexing mode. This includes radio link management. [RAN2] |
| Handover: Study and identify mobility requirements and necessary measurements that may be needed for handovers between some non-terrestrial space-borne vehicles (such as Non Geo stationary satellites) that move at much higher speed but over predictable paths [RAN2, RAN1] |
| Architecture: Identify needs for the 5G's Radio Access Network architecture to support non-terrestrial networks (e.g. handling of network identities) [RAN3] |
| Paging: procedure adaptations in case of moving satellite foot prints or cells |

Note:
This new study item does not address regulatory issues.

The coverage pattern of an NTN is described in 3GPP Technical Report (TR) 38.811 in Section 4.6 as follows:

Satellite or aerial vehicles typically generate several beams over a given area.

The footprint of the beams is typically elliptic shape.

The beam footprint may be moving over the earth with the satellite or the aerial vehicle motion on its orbit. Alternatively, the beam footprint may be earth fixed, in such case some beam pointing mechanisms (mechanical or electronic steering feature) will compensate for the satellite or the aerial vehicle motion.

TABLE 4.6-1

| Typical beam footprint size | | | |
| --- | --- | --- | --- |
| Attributes | GEO | Non-GEO | Aerial |
| Beam footprint size in diameter | 200-1000 km | 100-500 km | 5-200 km |

FIG. 2 depicts typical beam patterns of various NTN access networks.

Current Idle Mode/Radio Resource Control (RRC) Inactive State Procedures

There are 3 processes for NR UE in RRC_IDLE and RRC_INACTIVE state: (1) Public Land Mobile Network (PLMN) selection, (2) cell selection and reselection, and (3) location registration and RAN-based Notification Area (RNA) update. The RAN update is only applicable for RRC_INACTIVE state, while the rest are applicable to both RRC_IDLE and RRC_INACTIVE.

The overall UE procedures in RRC_IDLE and RRC_INACTIVE state are described as follows.

When a UE is switched on

1) Non-Access Stratum (NAS) selects a PLMN for the UE and may set the associated Radio Access Technology(ies) (RAT(s))
   a. If available, NAS can provide a list of equivalent PLMNs for cell (re)selection
2) UE performs cell selection (i.e., camp on the cell) with the following tasks
   a. Search for a suitable cell of the selected PLMN
   b. Choose the cell that provides available services
   c. Monitor the control channel of the cell 3) If necessary, by means of a NAS registration procedure, UE registers its presence in the tracking area of the cell
   a. The selected PLMN becomes the registered PLMN after a successful location registration
4) When camped on a cell, the UE shall regularly search for a better cell according to the cell reselection criteria. If UE finds a more suitable cell according to cell reselection criteria, it camps on the reselected more suitable cell
   a. In RRC_IDLE state, if the new cell does not belong to any tracking area in the list of tracking areas of the UE, UE performs location registration
   b. In RRC_INACTIVE state, if the new cell does not belong to the configured RNA, UE performs RNA update
5) If necessary, UE shall search for PLMNs of higher priority at regular time intervals per NAS procedure
   a. If NAS selects another PLMN, UE shall search for a suitable cell
6) If coverage is lost in the registered PLMN, new PLMN selection can be performed either automatically or manually In RRC_IDLE and RRC_INACTIVE state, UE needs to perform measurements to support PLMN selection, cell selection and reselection as part of Access Stratum procedures, and reports to the NAS. Requirements for measurements are described in 3GPP Technical Specification (TS) 38.133.

In Global System for Mobile Communication (GSM), Wideband Code Division Multiple Access (WCDMA), and LTE, a UE in RRC Idle mode is expected to perform similar procedures as outlined above for NR.

Current Measurements Rules for Performing Cell Reselection

In current LTE and NR, the UE is expected to regularly perform Reference Signal Received Power (RSRP)/Reference Signal Received Quality (RSRQ) measurements for cell reselection purposes in idle mode on inter-frequency and intra-frequency neighboring cells. There is however a set of exceptions to these rules which are based on whether the signal strength/quality of the current cell is above certain thresholds, which is generally as below:

- the cell selection Receive (RX) level value (related to RSRP measurements) Srxlev>ThresholdP
- the cell selection quality value (related to RSRQ measurements) Squal>ThresholdQ If these are fulfilled the UE may choose not to perform intra-frequency (or inter-frequency) measurements (whichever applies). The thresholds for RX level and quality value depend on whether the UE is measuring on inter or intra-frequency cells. For intra-frequency the RX level threshold is s-IntraSearchP, which ranges from 0 to 62 decibels (dB) at the step size of 2 dB and the quality value threshold is s-IntraSearchQ range from 0 to 31 dB at the step size of 1 dB. For inter-frequency the RX level threshold is s-NonIntraSearchP, which ranges from 0 to 62 dB at the step size of 2 dB. The values of s-NonIntraSearchQ range from 0 to 31 dB at the step size of 1 dB.

For Narrowband IoT (NB-IoT), only the RX level condition needs to be met.

These rules are for LTE and presented in detail in 3GPP TS 36.304 section 5.2.4.2 and 5.2.4.2a.

In addition, LTE measurements rules for further relaxed monitoring are specified in 3GPP TS 36.304 section 5.2.4.12. According to these rules a device may refrain from performing neighbor cell measurements for up to 24 hours in case the most recent measurement of the camped-on cell signal strength Srxlev is within a threshold $S_{SearchDeltaP}$ from a reference value $Srxlev_{Ref}$.

P80108 defines the remaining time $T_{service}$ until the service link is switched to a different satellite, or a different spot beam. Alternatively, $T_{service}$ corresponds to the time until the serving satellite constellation, or spot beam, goes out of coverage. Alternatively, $T_{service}$ corresponds to the time until the elevation angle to the serving satellite goes below a threshold defining the suitability of a cell. In P80108, $T_{service}$ is used for deciding random access to a target.

Problems with Existing Solutions

There currently exist certain challenge(s). Existing idle mode procedures would require a UE to perform cell reselection measurements that are unnecessary for NTN given that the satellite radio propagation environment is much more predictive compared to the terrestrial case.

FIG. 3 is a graphical representation of RSRP as a function of distance moving from one GEO satellite cell to another. The current rules for relaxing the measurements, which are based on signal strength, are not suitable for satellite systems due to the small difference in signal strength across neighboring cells.

In the LEO earth fixed cell, satellites take turns covering a certain area on the ground. Hence, a cell in which a UE is served disappears and is replaced by other cells when the satellite through which the serving cell is beamed is about to go beyond horizon. In 3GPP TR 38.821 it has been stated that UE location can be taken into account in RRC_IDLE/RRC_INACTIVE mode procedures. However, the UE location is not enough when the current cell is about to disappear and a new one is emerging due to satellite movements.

The temporary nature of the coverage of a satellite is not considered when accessing a cell. 3GPP assumes that the service link is operational for an elevation angle exceeding a certain threshold (e.g., 10 degrees). 3GPP has, however, not considered whether the elevation angle is increasing or decreasing due to the satellite moving towards or away from the device. If the elevation angle is just above the threshold and decreasing, this means that the service link may only be operational for a very limited time, due to the high velocity of the serving non-GEO satellite.

For earth moving beams, the beams are "non-steerable" which means a grid of beams sweep the earth and that the coverage area of a beam leaves the geographical location of a non-moving UE at a speed determined by the satellite velocity and the beam size. A beam switch may occur after just a handful of seconds.

All the above—in particular the fairly constant channel quality a UE typically perceives in an NTN cell and the cell switches caused by satellite movements—are properties that impact the environment for the UE and the circumstances for its procedures. However, consequent relevant modifications of the UE procedures are to a large extent lacking. There is a lot of room for improvement if these NTN properties are leveraged.

SUMMARY

User Equipment (UE) procedures are provided for controlling channel quality measurements in Non-Terrestrial Networks (NTNs). One proposed solution adds an expected duration of time the UE is to be served (or will be served) by a NTN serving cell, referred to as $T_{service}$, to the rules of channel quality measurements (e.g., Reference Signal Received Power (RSRP)/Reference Signal Received Quality (RSRQ) measurements). In fact, the duration of time $T_{service}$ (T_service) may be interpreted as a time duration remaining until the concerned cell will or would cease to provide service to the UE.

$T_{service}$ represents the remaining time until the UE's serving cell will be replaced by another cell (i.e., the time until another satellite will take over the responsibility to cover the UE's location). In some embodiments, $T_{service}$ is added to the rules of channel quality measurements such that the UE does not have to measure neighbor cells if the $T_{service}$ is high enough for the current cell and current channel quality in the cell (e.g., the cell RSRP) is good enough. Or, even if RSRP of the current cell is high enough, UE needs to measure if $T_{service}$ of the current cell is less than a threshold.

In one example, as neighbor cell RSRP values are similar, it results that RSRP measurements are not triggered at all as long as the serving satellite is present. However, especially for Earth fixed beams, when the serving cell leaves due to movement of the serving satellite, the UE has not necessarily measured RSRP of neighbour cells at all. Thus, $T_{service}$ is either used by itself or combined with the RSRP rule.

In some embodiments, a method is performed by a UE for controlling channel quality measurements in a NTN, the method comprising: determining an expected time the UE is to be served by an NTN serving cell ($T_{service}$); and controlling channel quality measurements made by the UE based on the $T_{service}$.

In some embodiments, the $T_{service}$ corresponds to remaining time until a service link between the UE and the NTN is switched to a different satellite or a different spot beam.

In some embodiments, the $T_{service}$ corresponds to remaining time until a serving satellite or a spot beam of the NTN goes out of coverage.

In some embodiments, the $T_{service}$ corresponds to remaining time until an elevation angle to a serving satellite falls below a threshold defining suitability of the NTN serving cell.

In some embodiments, controlling the channel quality measurements made by the UE is further based on a current channel quality of the NTN serving cell. In some embodiments, the current channel quality of the NTN serving cell is based on one or more of RSRP, RSRQ, Signal-to-Interference-plus-Noise Ratio (SINR), Signal-to-Noise Ratio (SNR), Received Signal Strength Indicator (RSSI), or pathloss.

In some embodiments, controlling the channel quality measurements comprises relaxing the channel quality measurements until the $T_{service}$ is below a threshold value ($T_{threshold}$). In some embodiments, the $T_{threshold}$ is configurable by a network serving the UE. In some embodiments, the $T_{threshold}$ is a specified value. In some embodiments, controlling the channel quality measurements comprises relaxing the channel quality measurements until the $T_{service}$ is below the $T_{threshold}$ when the current channel quality of the NTN serving cell is above a given quality measurement.

In some embodiments, relaxing the channel quality measurements comprises omitting channel quality measurements of one or more neighboring cells until the $T_{service}$ is below the $T_{threshold}$. In some embodiments, relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement. In some embodiments, relaxing the channel quality measurements further comprises decreasing a frequency of channel quality measurements of the NTN serving cell until the $T_{service}$ is below the $T_{threshold}$.

In some embodiments, relaxing the channel quality measurements comprises decreasing a frequency of channel quality measurements of one or more neighboring cells until the $T_{service}$ is below the $T_{threshold}$. In some embodiments, relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement. In some embodiments, relaxing the channel quality measurements further comprises decreasing a frequency of channel quality measurements of the NTN serving cell until the $T_{service}$ is below the $T_{threshold}$.

In some embodiments, controlling the channel quality measurements made by the UE is further based on a speed and motional direction of the UE. In some embodiments, controlling the channel quality measurements comprises relaxing the channel quality measurements until the $T_{service}$ is below a $T_{threshold}$; and the $T_{threshold}$ is based on the speed and motional direction of the UE.

In some embodiments, controlling the channel quality measurements made by the UE is further based on a location of the UE. In some embodiments, controlling the channel quality measurements comprises relaxing the channel quality measurements until the $T_{service}$ is below a $T_{threshold}$; and the $T_{threshold}$ is based on the location of the UE.

In some embodiments, the method further comprises controlling the channel quality measurements made by the UE based on the $T_{service}$ when the UE is in RRC_IDLE or RRC_INACTIVE state.

In some embodiments, the method further comprises controlling the channel quality measurements made by the UE based on the $T_{service}$ when the UE is in RRC_CONNECTED state.

In some embodiments, a UE for controlling channel quality measurements in a NTN is provided, the UE comprising processing circuitry configured to perform any of the steps of any of the above embodiments.

In some embodiments, a method is performed by a base station component for controlling channel quality measurements by a UE in a NTN, the method comprising: configuring a UE to control channel quality measurements made by the UE based on a $T_{service}$.

In some embodiments, configuring the UE to control the channel quality measurements comprises configuring the UE to control the channel quality measurements further based on a current channel quality of the NTN serving cell.

In some embodiments, the UE controls channel quality measurements by relaxing the channel quality measurements until the $T_{service}$ is below a $T_{threshold}$. In some embodiments, configuring the UE to control the channel quality measurements comprises configuring the $T_{threshold}$. In some embodiments, the $T_{threshold}$ is based on a speed and motional direction of the UE. In some embodiments, the $T_{threshold}$ is based on a location of the UE.

In some embodiments, configuring the UE to control the channel quality measurements made by the UE comprises causing the UE to omit or reduce channel quality measurements of one or more neighboring cells until the $T_{service}$ is below the $T_{threshold}$.

In some embodiments, configuring the UE to control the channel quality measurements made by the UE comprises causing the UE to omit or reduce channel quality measurements of the NTN serving cell until the $T_{service}$ is below the $T_{threshold}$.

In some embodiments, a base station component for controlling channel quality measurements by a UE in a NTN is provided, the base station component comprising processing circuitry configured to perform any of the steps of any of the above embodiments.

Certain embodiments may provide one or more of the following technical advantage(s). The RSRP/RSRQ measurement rules and related relaxation rules are updated such that those work well for NTN Low Earth Orbit (LEO) scenarios. For example, a UE performs neighbor cell measurements only when there really is a need to change the cell the UE is camping.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 is a flow chart that illustrates the operation of a base station component in accordance with at least some aspects of the embodiments described herein.

DETAILED DESCRIPTION

Figure 1:
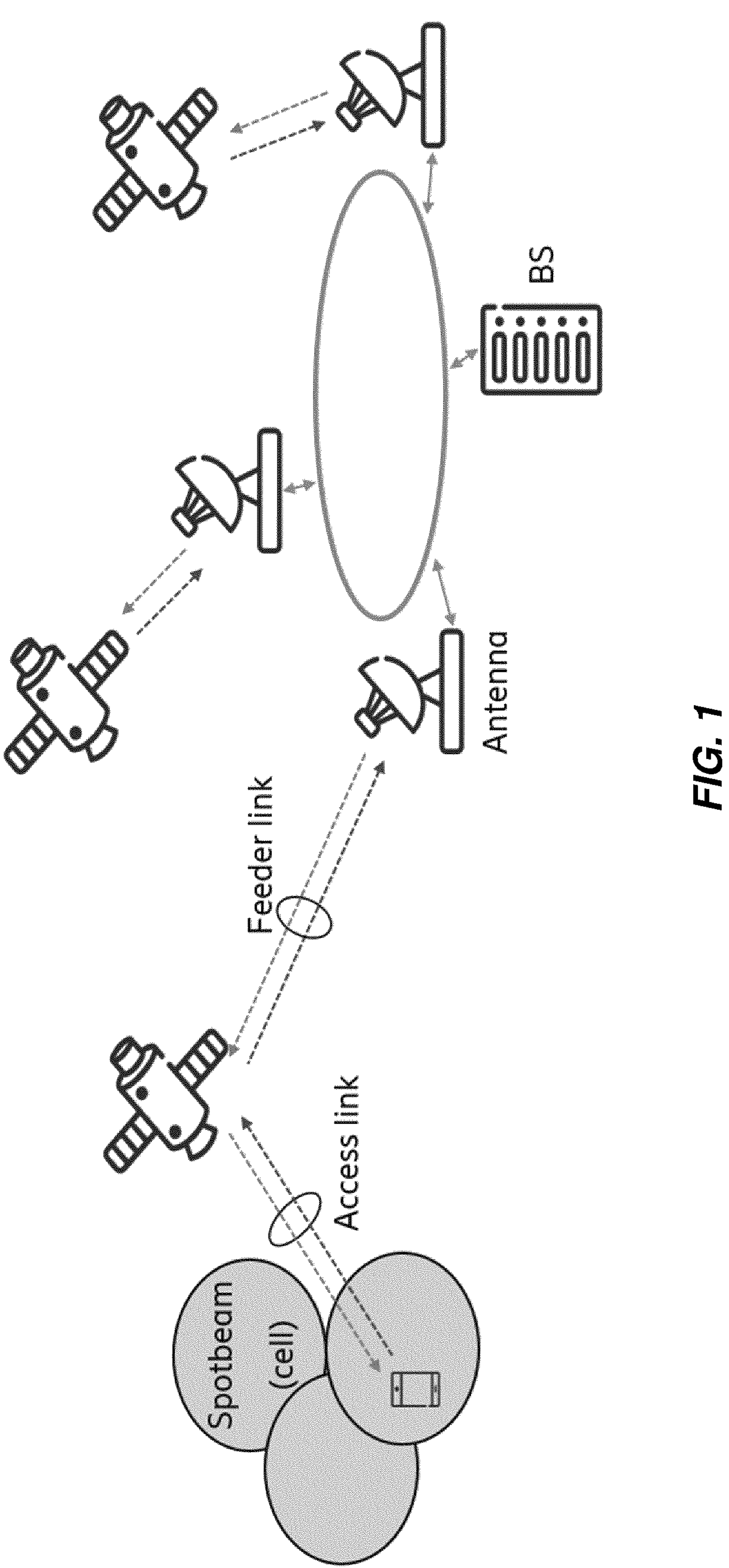
FIG. 1 shows an example architecture of a satellite network with bent pipe transponders.
Figure 2:
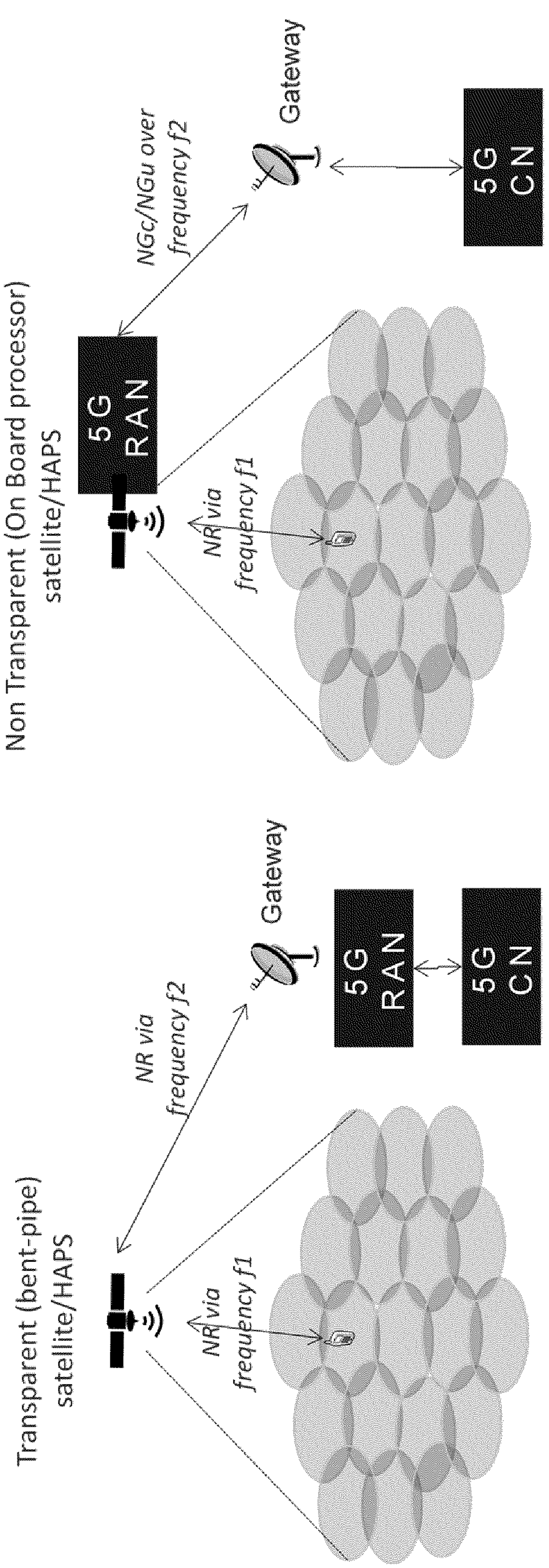
FIG. 2 depicts typical beam patterns of various Non-Terrestrial Network (NTN) access networks.
Figure 3:
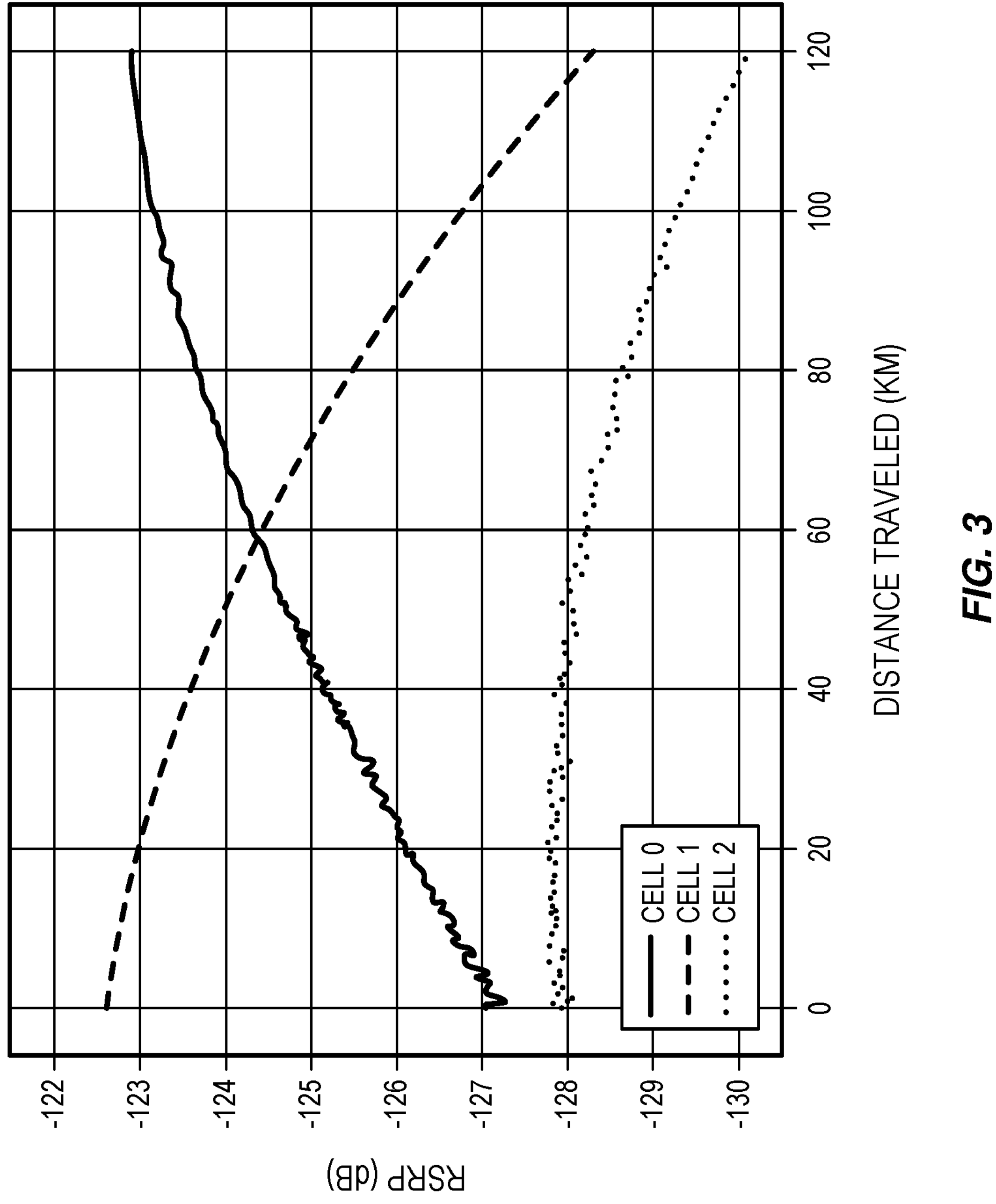
FIG. 3 is a graphical representation of Reference Signal Received Power (RSRP) as a function of distance moving from one Geostationary Orbit (GEO) satellite cell to another.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
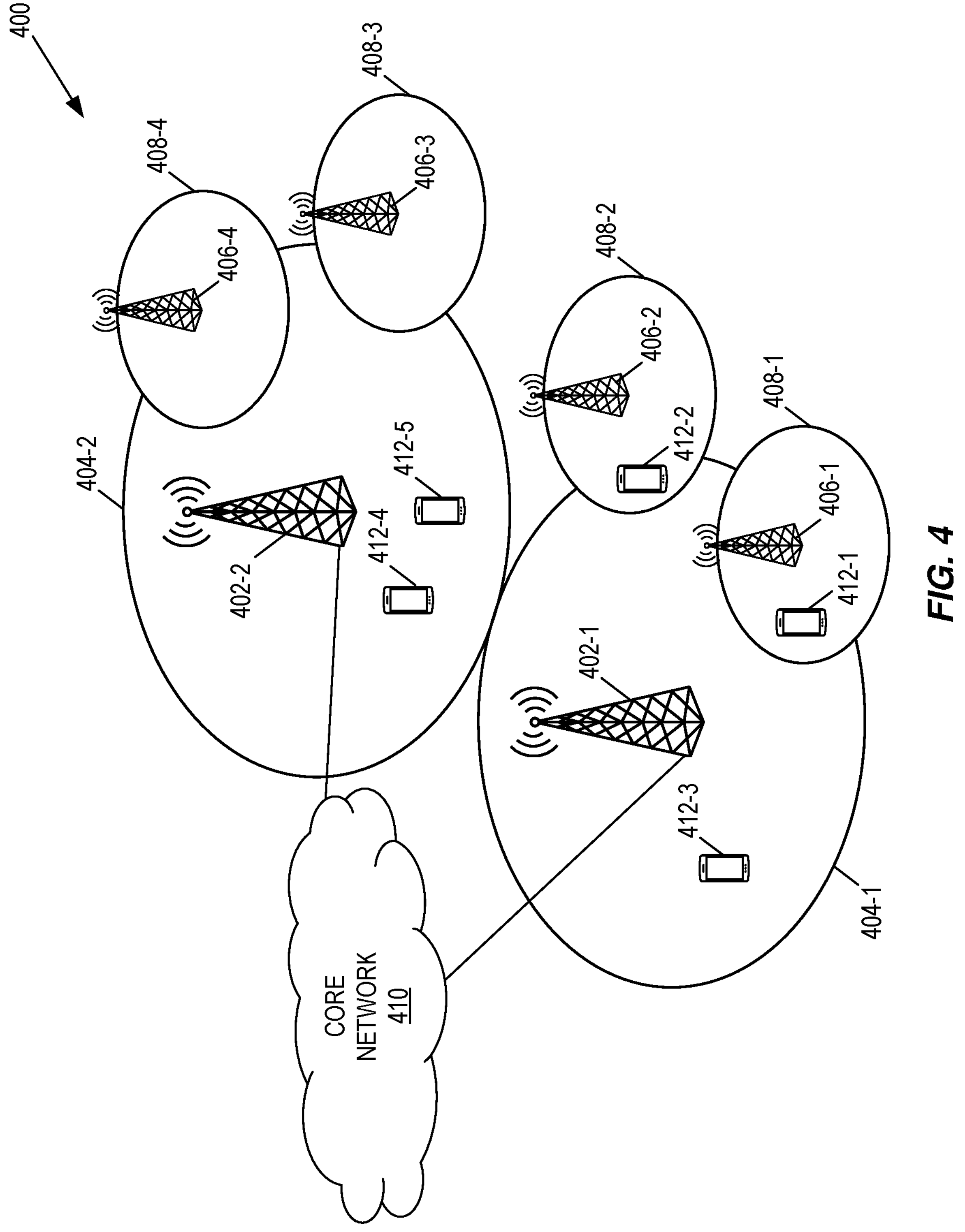
FIG. 4 illustrates one example of a wireless communications system in which embodiments of the present disclosure may be implemented.

FIG. 4 illustrates one example of a wireless communications system 400 in which embodiments of the present disclosure may be implemented. In the embodiments described herein, the wireless communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 402-1 and 402-2, which in the 5GS include gNBs and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The wireless communications system 400 also includes a core network 410, which in the 5GS is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
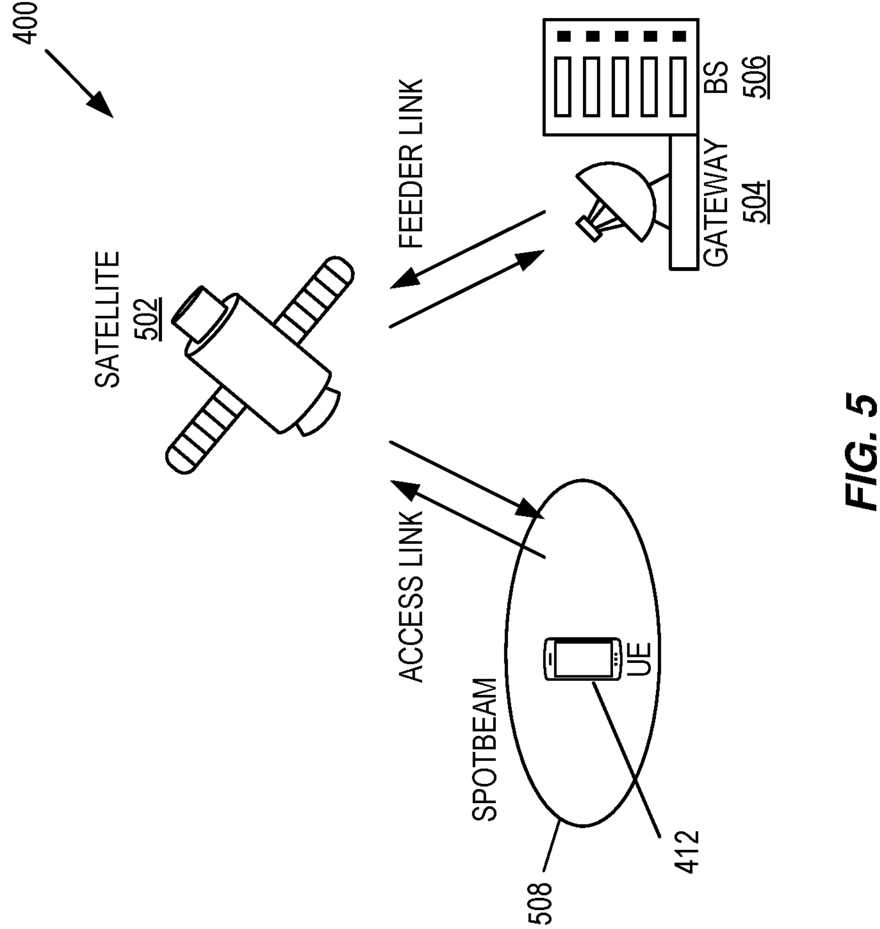
FIG. 5 illustrates one example of the wireless communication system in which at least part of the Radio Access Network (RAN) of FIG. 4 is an NTN.

FIG. 5 illustrates one example of the wireless communication system 400 in which at least part of the RAN of FIG. 4 is a Non-Terrestrial Network (NTN) (i.e., wherein at least one of the base stations is a NTN base station, which may be referred to herein as an example a gNB in an NTN or an NTN gNB). As illustrated, the wireless communication system 400 includes a NTN, which includes, in this example, a satellite 502 (i.e., a space or airborne radio access node or platform) and one or more gateways 504 that interconnect the satellite 502 to a land-based base station component 506. The functionality of a base station described herein may be implemented in the satellite 502 or distributed between the satellite 502 and the land-based base station component 506 (e.g., the satellite 502 may implement L1 functionality and the land-based base station component 506 may implement L2 and L3 functionality).

In this example, the UE 412 communicates with the NTN via the satellite 502. The satellite 502 (whether implemented with the functionality of a base station or operating in conjunction with a land-based base station component 506) generates one or more beams over a given area, each of which is considered as a cell 508. Note that the wireless communication system 400 is only one example of a wireless communication system that utilizes an NTN for radio access. The embodiments disclosed here are equally applicable to any such system.

Now, a description of some example embodiments of the present disclosure is provided.

Embodiments described herein leverage the fact that when a UE 412 is served by a NTN, the time remaining until a UE's 412 current serving cell 508 disappears is predictable. For Earth-fixed beams, the serving cell 508 can disappear when one satellite 502 is not able to serve the area even if beam steering is used to keep the satellite beam earth-fixed. For Earth-moving beams, the satellite beam sweeps the earth and thus the $T_{service}$ (period or duration of time until the serving cell 508 is replaced by another cell) is limited. Together with the fact that the channel quality in an NTN cell 508 typically remains fairly constant across the entire cell area, this allows a solution whereby the channel quality measurements performed by a UE 412 may be relaxed, based on the time remaining until the UE's 412 current serving cell 508 will be replaced by another cell (i.e., the time until another satellite will take over the responsibility to cover the UE's 412 location).

In embodiments targeting a UE 412 in RRC_IDLE and RRC_INACTIVE state, the proposed solution adds $T_{service}$ to the rules of channel quality measurements (e.g., Reference Signal Received Power (RSRP)/Reference Signal Received Quality (RSRQ) measurements), such that regardless of serving cell 508 quality versus neighbor cell quality, the UE 412 does not have to measure neighbor cells if the $T_{service}$ is high enough for the current cell 508 and current channel quality in the cell 508 (e.g., the cell RSRP) is good enough. Here, $T_{service}$ represents the remaining time until the UE's 412 serving cell 508 will be replaced by another cell (i.e., the time until another satellite will take over the responsibility to cover the UE's 412 location).

In some embodiments, the $T_{service}$ is calculated by the UE 412 based on parameters configured by the network (e.g., by the base station 506). In other embodiments, the $T_{service}$ is calculated by the network (e.g., by the base station component 506, the satellite 502, another network node, or a combination of these) and provided to the UE 412. The parameters needed to calculate the $T_{service}$ or the $T_{service}$ can be preconfigured by the network or provided over NAS, Radio Resource Control (RRC), a system information message, etc. For example, for an Earth-fixed beam, movement of the serving cell 508 is known by the network operator and can be provided to the UE 412. For an Earth-moving beam, the cell movement is known and is part of ephemeris data, but also depends on where the UE 412 is located such that the UE 412 may calculate the $T_{service}$ based on its location and the ephemeris data received from the network.

For instance, neighbor cell measurements may be omitted until $T_{service}<T_{threshold}$, where $T_{threshold}$ is a configurable or specified threshold value. The UE 412 can determine whether the serving cell quality is sufficiently good through one or more initial serving cell quality measurements and if this/these consistently result in a serving cell quality above a configured or specified threshold value, then the UE 412 may omit neighbor cell measurements until $T_{service}<T_{threshold}$. Optionally, the serving cell channel quality measurements can also be relaxed while sufficient time remains until the UE 412 has to change cell. For instance, if the UE 412 one or a few times consistently measures good serving cell channel quality (e.g., the current channel quality is above a given quality measurement), the UE 412 may omit further serving cell measurements (as well as neighbor cell measurements) until the cell change is imminent or rather close in time (e.g., less than $T_{threshold}$).

Alternatively, instead of completely omitting serving cell measurements, the UE 412 may decrease the frequency of the serving cell measurements. As one possibility, the choice between omitting the serving cell measurements or completely omitting the serving cell measurements may depend on the initially measured serving cell quality (e.g., such that if the serving cell quality is above a threshold, the UE 412 can omit the subsequent serving cell measurements, whereas if the serving cell quality is below the threshold, the UE 412 continues to repeatedly measure the serving cell quality but less frequently).

The option to decrease the measurement frequency instead of omitting the measurements completely can be applied also to the neighbor cell measurements.

In embodiments targeting a UE 412 in RRC_CONNECTED state, the UE 412 (e.g., if stationary or slow-moving) may be configured to relax its neighbor cell measurements in RRC_CONNECTED state based on the duration of time the UE 412 is expected to be served in the current cell 508 (i.e., $T_{service}$). A UE 412 could be configured with measurement configuration(s), whose "activation" could be conditioned on the duration of time the UE 412 is expected to be served in the current cell 508 ($T_{service}$), preferably together with a serving cell channel quality condition, such that the measurements are activated if the serving cell channel quality goes below a configured threshold, even if the expected duration of time to be served is still not short enough to by itself motivate activation of the measurements. As one embodiment, this condition can be configured in the ReportConfigNR Information Element (IE) (or a corresponding new IE adapted to NTN, e.g., ReportConfigNTN or ReportConfigNTN-LEO).

The methods for determining whether measurement relaxation is suitable described above for RRC_IDLE and RRC_INACTIVE state UEs 412 may also be used by a UE 412 in RRC_CONNECTED state. In one embodiment, this activation condition may be included in the $T_{service}<T_{threshold}$. An advantage of this embodiment is that the network does not have to track the UE 412 location but can configure the measurements early and the UE 412 starts measuring when there is need to measure the neighbor cells.

In some embodiments, the application of the measurement relaxations described above (for RRC_IDLE, RRC_INACTIVE and/or RRC_CONNECTED state) depends on the UE's 412 speed and motional direction, e.g., such that if the UE 412 is moving fast against the cell's 508 reference center (e.g., such that it may traverse a distance representing a significant part of the cell's 508 diameter in a time period equal to the typical time between changes of satellites at a location), the UE 412 may not be allowed to relax the measurements. This may be configured by the network.

In some embodiments, the UE's 412 location is taken into account such that if the UE 412 is located close to the cell border, the measurement relaxations may not be allowed. This may be a matter of configuration provided by the network. To be specific, there may be a location trigger similar to the $T_{service}$ trigger. If a UE 412 location is further away than a distance $D_{threshold}$ from the reference center of the cell 508, the measurement relaxations may not be allowed. This condition may be applied in all embodiments described for $T_{service}$ in place of $T_{service}$ or in addition to $T_{service}$.

A condition for allowing relaxation of measurements may also consist of a combination of UE 412 speed, UE 412 motional direction, and UE 412 location (in relation to the cell border), e.g., such that measurement relaxation is not allowed if the UE's 412 speed is high, UE 412 travels against the reference center of the cell 508, and the UE 412 is close to the cell border (e.g., if the UE's 412 speed allows it to traverse a distance roughly equal to the distance to the cell border in a time period in the same order as the typical time between changes of satellites at a location). Such a combined condition may be configured by the network.

In another embodiment, especially for UEs 412 moving with a relatively high speed (e.g., high speed UEs for which speed may not be considered as negligible with respect to the satellite providing coverage to the geographical area), when the UE 412 is required to perform intra-frequency or inter-frequency measurement according to the measurement rules specified in 3GPP TS 36.304 or 38.304, the UE 412 may choose not to perform intra-frequency or inter-frequency measurements not only since the duration of time the UE 412 is expected to be served in the current cell 508 is high enough and current channel quality in the current cell 508 (e.g., the cell RSRP) is good enough (as described above), but also since relaxed monitoring criterion is fulfilled for a period of time, i.e., $T_{searchrelaxed}$. In that case relaxed monitoring criterion may have the following condition:

$$(\mathrm{Srxlev}_{Ref}-\mathrm{Srxlev})<S_{Search} \text{ and/or } (T_{service}-T_{serviceRef})<T_{Search}$$

where:

Srxlev=current Srxlev value of the serving cell 508 (dB).

$\mathrm{Srxlev}_{Ref}$=reference Srxlev value of the serving cell 508 (dB), set as follows:

$$\text{if } (\mathrm{Srxlev}-\mathrm{Srxlev}_{Ref})>0, \text{ or } (T_{serviceRef}-T_{service})>0$$

If the relaxed monitoring criterion has not been met for $T_{searchrelaxed}$:

the UE 412 shall set the value of $\mathrm{Srxlev}_{Ref}$ to the current Srxlev value of the serving cell 508 and $T_{serviceRef}$ to the current value of the expected duration of time to be served in the serving cell 508;

$T_{searchrelaxed}$ is a fixed value in the specifications or a configured value provided by the network or the Discontinuous Reception (DRX)/Extended DRX (eDRX) cycle length if configured and it is longer than $T_{searchrelaxed}$.

This embodiment is essentially about introducing a mechanism to do relatively more frequent checks as the expected duration of time to be served becomes closer to the threshold, $T_{threshold}$.

In all embodiments, the measurements which may be either performed or relaxed may involve one of, or a combination of, RSRP, RSRQ, Signal-to-Interference-plus- Noise Ratio (SINR), Signal-to-Noise Ratio (SNR), Received Signal Strength Indicator (RSSI) and/or pathloss (or any other relevant measurement type/entity/quantity).

Some embodiments related to $T_{threshold}$ are described as follows.

As one embodiment, the principle to specify or configure $T_{threshold}$ can take into account the UE 412 location and the satellite constellation imposing implicit limitations on $T_{threshold}$ choices. In certain geographical location, the number of the available satellites existing in respective aerial area is limited (to be visible for UEs 412), e.g., in high latitude area and/or only a small satellite constellation is deployed in use. In the above interested scenario, a relatively larger $T_{threshold}$ may be configured from the network side, or, as one embodiment, a geo-location-based margin $T_{threshold\_loc\_margin}$ may be added by the UE 412 (with Global Navigation Satellite System (GNSS)-capability) to the configured $T_{threshold}$ to ensure sufficient neighbor cells can be measured in the enlarged time window, if the information (e.g., position information, satellite constellation information, etc.) indicates the number of the available satellites to be appear in the respective area within $T_{threshold}$ period is below a configured threshold. A network-configured relatively large $T_{threshold}$ is enabled by the estimate of the UE's 412 location (e.g., based on the used beams and/or the angle of arrival of uplink transmission from the UE 412), and/or from the available global ephemeris data of the nearby satellite constellation.

An advantage of this embodiment is that the UE 412 has the possibility to measure enough neighbor satellite cells and to reduce the chance of the UE 412 having to choose among satellites providing limited channel qualities (only because they are the ones available for measurement in period $T_{threshold}$). A zero or negative $T_{threshold\_loc\_margin}$ is allowed to be set by the UE 412 if more than needed satellites will appear in the period of $T_{threshold}$, for instance, when the UE 412 is located in the equatorial region. Alternatively, if $T_{threshold}$ remains unchanged or $T_{threshold\_loc\_margin}$ is set to zero, measurement relaxation rule can be applied.

It should be noted that the methods of setting the value for $T_{threshold}$ are implementation-specific aspects.

Whether $T_{threshold\_loc\_margin}$ is an implementation-specific parameter depends on whether the UE 412 will be given enough information: the UE 412 needs its position info to understand the aerial area (where satellites locate) with which it is associated (which is GNSS dependent), in addition, it also requires ephemeris data to calculate how many satellites will appear in the mentioned aerial area in $T_{threshold}+T_{threshold\_loc\_margin}$. One point that could justify specifying it might be, if $T_{threshold}$ and $T_{threshold\_loc\_margin}$ are separated, then $T_{threshold}$ becomes only dependent on the current satellite cell 508 while $T_{threshold\_loc\_margin}$ is about the other satellite candidates. If so, then $T_{threshold\_loc\_margin}$ derived from this number is considered something could be specified.

Figure 6:
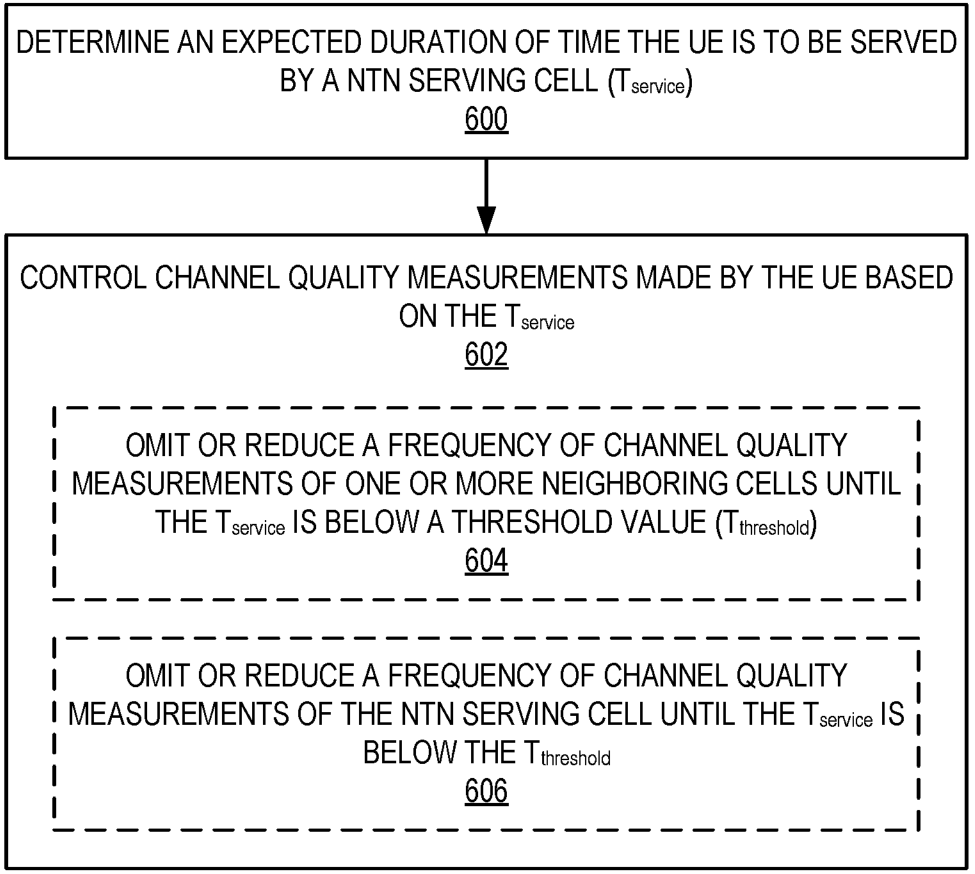
FIG. 6 is a flow chart that illustrates the operation of a User Equipment (UE) in accordance with at least some aspects of the embodiments described herein.

FIG. 6 is a flow chart that illustrates the operation of a UE 412 in accordance with at least some aspects of the embodiments described above. Optional steps are indicated with dashed lines. The UE 412 determines an expected duration of time the UE 412 is to be served by an NTN serving cell 508 ($T_{service}$) (step 600). The UE 412 then controls channel quality measurements made by the UE 412 based on the $T_{service}$ (step 602). Controlling the channel quality measurements may include relaxing the channel quality measurements. For example, the UE 412 may omit or reduce a frequency of channel quality measurements of one or more neighboring cells until the $T_{service}$ is below a threshold value ($T_{threshold}$) (step 604). In addition, the UE 412 may omit or reduce a frequency of channel quality measurements of the NTN serving cell 508 until the $T_{service}$ is below the $T_{threshold}$ (step 606).

FIG. 7 is a flow chart that illustrates the operation of a base station component 506 in accordance with at least some aspects of the embodiments described above. Optional steps are indicated with dashed lines. The base station component 506 configures a UE 412 to control channel quality measurements made by the UE 412 based on an expected duration of time the UE 412 is to be served by an NTN serving cell 508 ($T_{service}$) (step 700). Configuring the UE 412 to control the channel quality measurements may include causing the UE 412 to omit or reduce a frequency of channel quality measurements of one or more neighboring cells until the $T_{service}$ is below a threshold value ($T_{threshold}$) (step 702). In addition, configuring the UE 412 to control the channel quality measurements may include causing the UE 412 to omit or reduce a frequency of channel quality measurements of the NTN serving cell 508 until the $T_{service}$ is below the $T_{threshold}$ (step 704).

Figure 8:
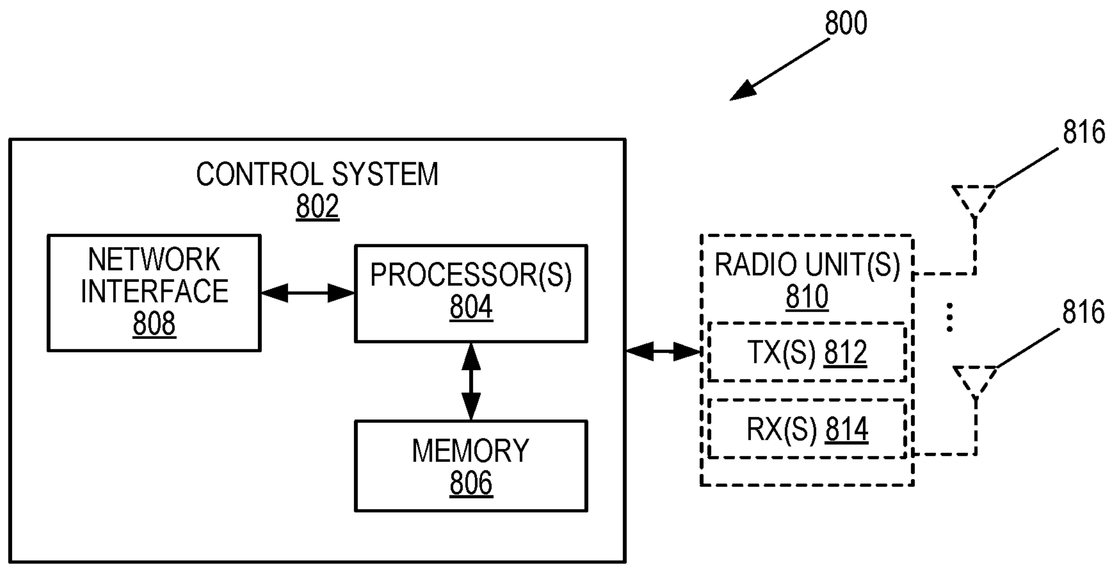
FIG. 8 is a schematic block diagram of a network node according to some embodiments of the present disclosure.

FIG. 8 is a schematic block diagram of a network node 800 according to some embodiments of the present disclosure. Optional features are represented by dashed boxes. The network node 800 may be, for example, a base station 402 or 406 or a network node that implements all or part of the functionality of the base station 402, gNB, radio access node, or base station component 506 described herein. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the network node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the network node 800 (e.g., the base station component 506 and/or additional functions) as described herein. In some embodiments, the function(s) are implemented in software that is stored, e.g., in the memory 806 and executed by the one or more processors 804.

Figure 9:
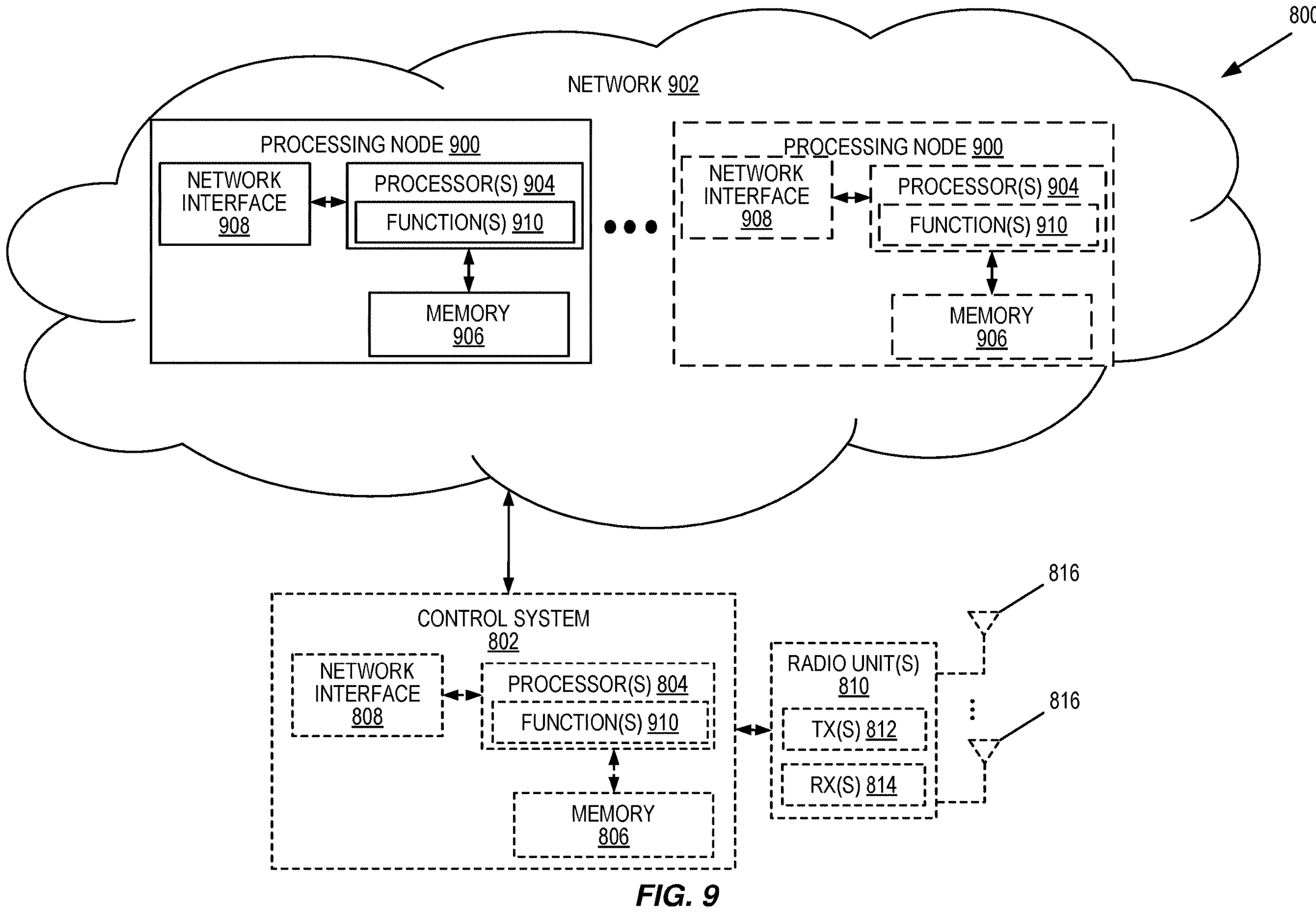
FIG. 9 is a schematic block diagram that illustrates a virtualized embodiment of the network node according to some embodiments of the present disclosure.

FIG. 9 is a schematic block diagram that illustrates a virtualized embodiment of the network node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 may include the control system 802 and/or the one or more radio units 810, as described above. The control system 802 may be connected to the radio unit(s) 810 via, for example, an optical cable or the like. The network node 800 includes one or more processing nodes 900 coupled to or included as part of a network(s) 902. If present, the control system 802 or the radio unit(s) 810 are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the network node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
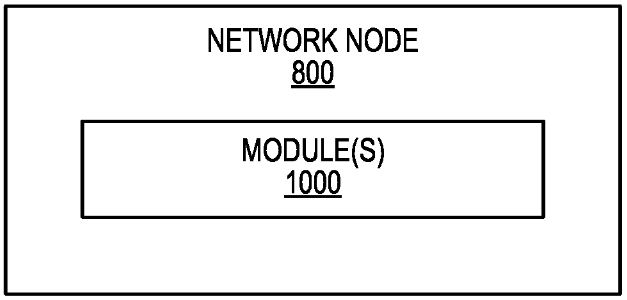
FIG. 10 is a schematic block diagram of the network node according to some other embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
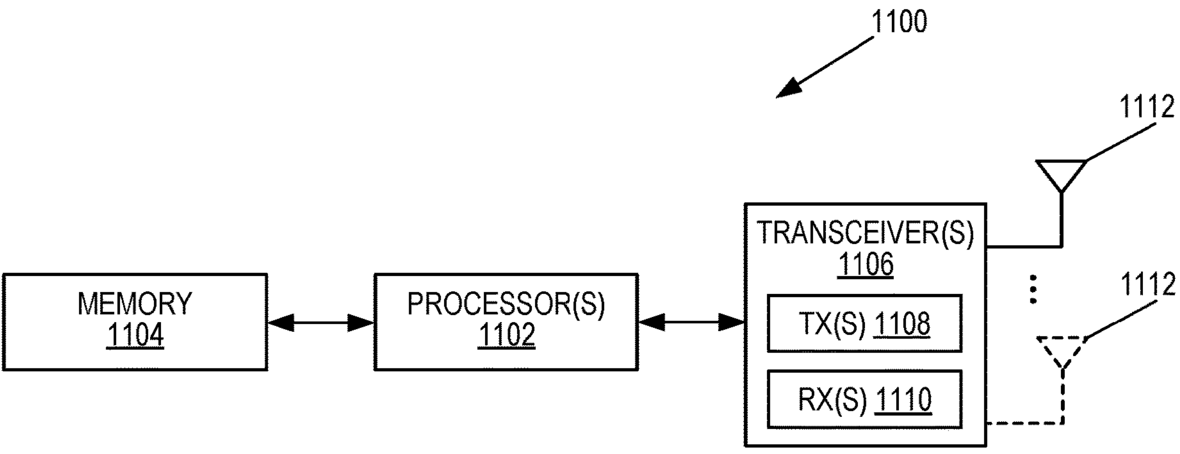
FIG. 11 is a schematic block diagram of a wireless communication device according to some embodiments of the present disclosure.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
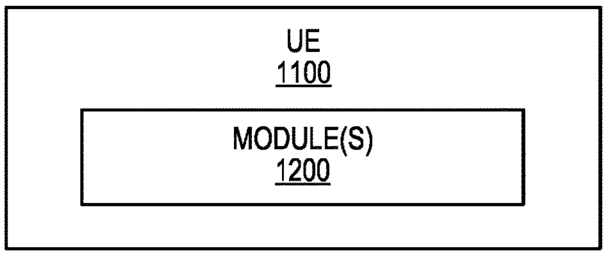
FIG. 12 is a schematic block diagram of the wireless communication device according to some other embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

GROUP A EMBODIMENTS

Embodiment 1: A method performed by a UE for controlling channel quality measurements in a NTN, the method comprising one or more of: determining an expected time the UE is to be served by a NTN serving cell, $T_{service}$; and controlling channel quality measurements made by the UE based on the $T_{service}$.

Embodiment 2: The method of embodiment 1, wherein the $T_{service}$ corresponds to remaining time until a service link between the UE and the NTN is switched to a different satellite or a different spot beam.

Embodiment 3: The method of embodiment 1, wherein the $T_{service}$ corresponds to remaining time until a serving satellite or a spot beam of the NTN goes out of coverage.

Embodiment 4: The method of embodiment 1, wherein the $T_{service}$ corresponds to remaining time until an elevation angle to a serving satellite falls below a threshold defining suitability of the NTN serving cell.

Embodiment 5: The method of any of embodiments 1 to 4, wherein controlling the channel quality measurements made by the UE is further based on a current channel quality of the NTN serving cell.

Embodiment 6: The method of embodiment 5, wherein the current channel quality of the NTN serving cell is based on one or more of RSRP, RSRQ, SINR, SNR, RSSI, or pathloss.

Embodiment 7: The method of any of embodiments 1 to 6, wherein controlling the channel quality measurements comprises relaxing the channel quality measurements until the $T_{service}$ is below a threshold value, $T_{threshold}$.

Embodiment 8: The method of embodiment 7, wherein the $T_{threshold}$ is configurable by a network serving the UE.

Embodiment 9: The method of embodiment 7, wherein the $T_{threshold}$ is a specified value.

Embodiment 10: The method of any of embodiments 7 to 9, wherein controlling the channel quality measurements comprises relaxing the channel quality measurements until the $T_{service}$ is below the $T_{threshold}$ when the current channel quality of the NTN serving cell is above a given quality measurement.

Embodiment 11: The method of any of embodiments 7 to 10, wherein relaxing the channel quality measurements comprises omitting channel quality measurements of one or more neighboring cells until the $T_{service}$ is below the $T_{threshold}$.

Embodiment 12: The method of embodiment 11, wherein relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement.

Embodiment 13: The method of embodiment 11, wherein relaxing the channel quality measurements further comprises decreasing a frequency of channel quality measurements of the NTN serving cell until the $T_{service}$ is below the $T_{threshold}$.

Embodiment 14: The method of any of embodiments 7 to 10, wherein relaxing the channel quality measurements comprises decreasing a frequency of channel quality measurements of one or more neighboring cells until the $T_{service}$ is below the $T_{threshold}$.

Embodiment 15: The method of embodiment 14, wherein relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement.

Embodiment 16: The method of embodiment 14, wherein relaxing the channel quality measurements further comprises decreasing a frequency of channel quality measurements of the NTN serving cell until the $T_{service}$ is below the $T_{threshold}$.

Embodiment 17: The method of any of embodiments 1 to 16, wherein controlling the channel quality measurements made by the UE is further based on a speed and motional direction of the UE.

Embodiment 18: The method of embodiment 17, wherein: controlling the channel quality measurements comprises relaxing the channel quality measurements until the $T_{service}$ is below a threshold value, $T_{threshold}$; and the $T_{threshold}$ is based on the speed and motional direction of the UE.

Embodiment 19: The method of any of embodiments 1 to 18, wherein controlling the channel quality measurements made by the UE is further based on a location of the UE.

Embodiment 20: The method of embodiment 19, wherein: controlling the channel quality measurements comprises relaxing the channel quality measurements until the $T_{service}$ is below a threshold value, $T_{threshold}$; and the $T_{threshold}$ is based on the location of the UE.

Embodiment 21: The method of any of embodiments 1 to 20, further comprising controlling the channel quality measurements made by the UE based on the $T_{service}$ when the UE is in RRC_IDLE or RRC_INACTIVE state.

Embodiment 22: The method of any of embodiments 1 to 20, further comprising controlling the channel quality measurements made by the UE based on the $T_{service}$ when the UE is in RRC_CONNECTED state.

Embodiment 23: A UE for controlling channel quality measurements in a NTN, the UE comprising: processing circuitry configured to perform any of the steps of any of embodiments 1 to 22; and power supply circuitry configured to supply power to the UE.

GROUP B EMBODIMENTS

Embodiment 24: A method performed by a base station for controlling channel quality measurements by a UE in a NTN, the method comprising: configuring a UE to control channel quality measurements made by the UE based on an expected time the UE is to be served by a NTN serving cell, $T_{service}$.

Embodiment 25: The method of embodiment 24, wherein the $T_{service}$ corresponds to remaining time until a service link between the UE and the base station is switched to a different satellite or a different spot beam.

Embodiment 26: The method of embodiment 24, wherein the $T_{service}$ corresponds to remaining time until a serving satellite or a spot beam of the NTN goes out of coverage.

Embodiment 27: The method of embodiment 24, wherein the $T_{service}$ corresponds to remaining time until an elevation angle to a serving satellite falls below a threshold defining suitability of the NTN serving cell.

Embodiment 28: The method of any of embodiments 24 to 27, wherein configuring the UE to control the channel quality measurements comprises configuring the UE to control the channel quality measurements further based on a current channel quality of the NTN serving cell.

Embodiment 29: The method of any of embodiments 24 to 28, wherein the UE controls channel quality measurements by relaxing the channel quality measurements until the $T_{service}$ is below a threshold value, $T_{threshold}$.

Embodiment 30: The method of embodiment 29, wherein configuring the UE to control the channel quality measurements comprises configuring the $T_{threshold}$.

Embodiment 31: The method of embodiment 30, wherein the $T_{threshold}$ is based on a speed and motional direction of the UE.

Embodiment 32: The method of any of embodiments 30 to 31, wherein the $T_{threshold}$ is based on a location of the UE.

Embodiment 33: The method of any of embodiments 29 to 32, wherein configuring the UE to control the channel quality measurements made by the UE comprises causing the UE to omit or reduce channel quality measurements of one or more neighboring cells until the $T_{service}$ is below the $T_{threshold}$.

Embodiment 34: The method of any of embodiments 29 to 33, wherein configuring the UE to control the channel quality measurements made by the UE comprises causing the UE to omit or reduce channel quality measurements of the NTN serving cell until the $T_{service}$ is below the $T_{threshold}$.

Embodiment 35: A base station for controlling channel quality measurements by a UE in a NTN, the base station comprising: processing circuitry configured to perform any of the steps of any of embodiments 24 to 34; and power supply circuitry configured to supply power to the base station.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core
5GS Fifth Generation System
AMF Access and Mobility Function
ASIC Application Specific Integrated Circuit
AUSF Authentication Server Function
CPU Central Processing Unit
DRX Discontinuous Reception
DSP Digital Signal Processor
eDRX Extended Discontinuous Reception
eNB Enhanced or Evolved Node B
EPC Evolved Packet Core
EPS Evolved Packet System
E-UTRAN Evolved Universal Terrestrial Radio Access Network
FPGA Field Programmable Gate Array
GEO Geostationary Orbit
gNB New Radio Base Station
gNB-CU New Radio Base Station Central Unit
gNB-DU New Radio Base Station Distributed Unit
GNSS Global Navigation Satellite System
GSM Global System for Mobile Communication
HSS Home Subscriber Server
IE Information Element
IoT Internet of Things
LEO Low Earth Orbit
LTE Long Term Evolution
MEC, Medium Earth Orbit
MME Mobility Management Entity
MTC Machine Type Communication
NAS Non-Access Stratum
NB-IoT Narrowband Internet of Things
NEF Network Exposure Function
NF Network Function
ng-eNB Next Generation Enhanced or Evolved Node B
NR New Radio
NRF Network Function Repository Function
NSSF Network Slice Selection Function
NTN Non-Terrestrial Network
PC Personal Computer
PCF Policy Control Function
P-GW Packet Data Network Gateway
PLMN Public Land Mobile Network
RAM Random Access Memory
RAN Radio Access Network
RAT Radio Access Technology
RNA Radio Access Network-based Notification Area
ROM Read Only Memory
RRC Radio Resource Control
RRH Remote Radio Head
RSRP Reference Signal Received Power
RSRQ Reference Signal Received Quality
RSSI Received Signal Strength Indicator
RX Receive
SCEF Service Capability Exposure Function
SI Study Item
SINR Signal-to-Interference-plus-Noise Ratio
SMF Session Management Function
SNR Signal-to-Noise Ratio
TCI Transmission Configuration Indicator
TR Technical Report
TRP Transmission/Reception Point
TS Technical Specification
UDM Unified Data Management
UE User Equipment
UPF User Plane Function
WCDMA Wideband Code Division Multiple Access Those skilled in the art will recognize improvements and modifications to the embodiments of the present disclosure. All such improvements and modifications are considered within the scope of the concepts disclosed herein.

The invention claimed is:

1. A method performed by a User Equipment, UE, for controlling channel quality measurements in a Non-Terrestrial Network, NTN, the method comprising:

determining an expected duration of time the UE is to be served by an NTN serving cell, $T_{service}$; and controlling channel quality measurements made by the UE based on the $T_{service}$, wherein controlling the channel quality measurements comprises relaxing the channel quality measurements until the $T_{service}$ is below a threshold value, $T_{threshold}$, wherein relaxing the channel quality measurements comprises omitting channel quality measurements of one or more neighboring cells until the $T_{service}$ is below the $T_{threshold}$.

2. The method of claim 1, wherein the $T_{service}$ corresponds to remaining time until a service link between the UE and the NTN is switched to a different satellite or a different spot beam.

3. The method of claim 1, wherein the $T_{service}$ corresponds to remaining time until a serving satellite or a spot beam of the NTN goes out of coverage.

4. The method of claim 1, wherein the $T_{service}$ corresponds to remaining time until an elevation angle to a serving satellite falls below a threshold defining suitability of the NTN serving cell.

5. The method of claim 1, wherein controlling the channel quality measurements made by the UE is further based on a current channel quality of the NTN serving cell.

6. The method of claim 5, wherein the current channel quality of the NTN serving cell is based on one or more of Reference Signal Received Power, RSRP, Reference Signal Received Quality, RSRQ, Signal-to-Interference-plus-Noise Ratio, SINR, Signal-to-Noise Ratio, SNR, Received Signal Strength Indicator, RSSI, or pathloss.

7. The method of claim 1, wherein the $T_{threshold}$ is configurable by a network serving the UE.

8. The method of claim 1, wherein the $T_{threshold}$ is a specified value.

9. The method of claim 1, wherein controlling the channel quality measurements comprises relaxing the channel quality measurements until the $T_{service}$ is below the $T_{threshold}$ when the current channel quality of the NTN serving cell is above a given quality measurement.

10. The method of claim 1, wherein relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement.

11. The method of claim 1, wherein relaxing the channel quality measurements further comprises decreasing a frequency of channel quality measurements of the NTN serving cell until the $T_{service}$ is below the $T_{threshold}$.

12. The method of claim 1, wherein controlling the channel quality measurements made by the UE is further based on a speed and motional direction of the UE.

13. The method of claim 12, wherein:

controlling the channel quality measurements comprises relaxing the channel quality measurements until the $T_{service}$ is below a threshold value, $T_{threshold}$; and the $T_{threshold}$ is based on the speed and motional direction of the UE.

14. The method of claim 1, wherein controlling the channel quality measurements made by the UE is further based on a location of the UE.

15. The method of claim 14, wherein:

controlling the channel quality measurements comprises relaxing the channel quality measurements until the $T_{service}$ is below a threshold value, $T_{threshold}$; and the $T_{threshold}$ is based on the location of the UE.

16. The method of claim 1, further comprising controlling the channel quality measurements made by the UE based on the $T_{service}$ when the UE is in RRC_IDLE or RRC_INACTIVE state.

17. The method of claim 1, further comprising controlling the channel quality measurements made by the UE based on the $T_{service}$ when the UE is in RRC_CONNECTED state.

18. A User Equipment, UE, for controlling channel quality measurements in a Non-Terrestrial Network, NTN, the UE comprising:

one or more transmitters;

one or more receivers; and processing circuitry configured to cause the UE to:

determine an expected duration of time the UE is to be served by an NTN serving cell, $T_{service}$; and control channel quality measurements made by the UE based on the $T_{service}$, wherein controlling the channel quality measurements comprises relaxing the channel quality measurements until the $T_{service}$ is below a threshold value, $T_{threshold}$, wherein relaxing the channel quality measurements comprises omitting channel quality measurements of one or more neighboring cells until the $T_{service}$ is below the $T_{threshold}$.

19. A method performed by a base station component for controlling channel quality measurements by a User Equipment, UE, in a Non-Terrestrial Network, NTN, the method comprising:

configuring a UE to control channel quality measurements made by the UE based on an expected duration of time the UE is to be served by an NTN serving cell, $T_{service}$, wherein controlling the channel quality measurements comprises relaxing the channel quality measurements until the $T_{service}$ is below a threshold value, $T_{threshold}$, wherein relaxing the channel quality measurements comprises omitting channel quality measurements of one or more neighboring cells until the $T_{service}$ is below the $T_{threshold}$.

20. A base station component for controlling channel quality measurements by a User Equipment, UE, in a Non-Terrestrial Network, NTN, the base station component comprising processing circuitry configured to cause the base station component to:

configure a UE to control channel quality measurements made by the UE based on an expected duration of time the UE is to be served by an NTN serving cell, $T_{service}$, wherein controlling the channel quality measurements comprises relaxing the channel quality measurements until the $T_{service}$ is below a threshold value, $T_{threshold}$, wherein relaxing the channel quality measurements comprises omitting channel quality measurements of one or more neighboring cells until the $T_{service}$ is below the $T_{threshold}$.

21. A method performed by a User Equipment, UE, for controlling channel quality measurements in a Non-Terrestrial Network, NTN, the method comprising:

determining an expected duration of time the UE is to be served by an NTN serving cell, $T_{service}$; and controlling channel quality measurements made by the UE based on the $T_{service}$, wherein controlling the channel quality measurements comprises relaxing the channel quality measurements until the $T_{service}$ is below a threshold value, $T_{threshold}$, wherein relaxing the channel quality measurements comprises decreasing a frequency of channel quality measurements of one or more neighboring cells until the $T_{service}$ is below the $T_{threshold}$.

22. The method of claim 21, wherein relaxing the channel quality measurements further comprises omitting further channel quality measurements of the NTN serving cell until the $T_{service}$ is below the $T_{threshold}$ after one or more channel quality measurements of the NTN serving cell indicate the current channel quality is above a given quality measurement.

23. The method of claim 21, wherein relaxing the channel quality measurements further comprises decreasing a frequency of channel quality measurements of the NTN serving cell until the $T_{service}$ is below the $T_{threshold}$.

24. A User Equipment, UE, for controlling channel quality measurements in a Non-Terrestrial Network, NTN, the UE comprising:

one or more transmitters;

one or more receivers; and processing circuitry configured to cause the UE to:

determine an expected duration of time the UE is to be served by an NTN serving cell, $T_{service}$; and control channel quality measurements made by the UE based on the $T_{service}$, wherein controlling the channel quality measurements comprises relaxing the channel quality measurements until the $T_{service}$ is below a threshold value, $T_{threshold}$, wherein relaxing the channel quality measurements comprises decreasing a frequency of channel quality measurements of one or more neighboring cells until the $T_{service}$ is below the $T_{threshold}$.

* * * * *